United States Patent [19]

Herrmann

[11] 4,452,705
[45] Jun. 5, 1984

[54] FILTER DEVICE FOR THE SOFTENING AND/OR COMPLETE DESALINATION OF A LIQUID, PARTICULARLY WATER

[76] Inventor: Willy Herrmann, Hagaecker 70, 7151 Affalterbach-Wolfsoelden, Fed. Rep. of Germany

[21] Appl. No.: 362,596

[22] Filed: Mar. 29, 1982

[30] Foreign Application Priority Data

Apr. 3, 1981 [DE] Fed. Rep. of Germany ....... 3113622

[51] Int. Cl.³ ............................................. B01J 47/02
[52] U.S. Cl. ..................................... 210/286; 210/291
[58] Field of Search ......... 210/286, 289, 291, 437–441

[56] References Cited

U.S. PATENT DOCUMENTS 1,951,917  3/1934  Leslie ................................. 210/286

Primary Examiner—Ivars C. Cintins

[57] ABSTRACT

A filter device for the softening and/or complete desalination of liquids includes a container which is filled with ion exchanger compound, through which the liquid to be treated flows, with an inflow an outflow opening. A hollow filtering member the interior of which is connected to a discharge opening for discharging purified liquid, is disposed in the container. The filtering member is disposed within a receiving space which is, at least largely, shielded from the ion exchanger compound and is in communication with the interior of the container.

This arrangement of the filtering member ensures that, for instance, raw water introduced into the container can act on the filtering member only if it has first penetrated the ion exchanger compound. The ion exchanger compound can accumulate only in the lower open region of the receiving space, so that the exposed side of the filtering member remains free of ion exchanger compound and abraded particles over its larger part and as a result, its openings remain unclogged.

4 Claims, 2 Drawing Figures

FILTER DEVICE FOR THE SOFTENING AND/OR COMPLETE DESALINATION OF A LIQUID, PARTICULARLY WATER

BACKGROUND OF THE INVENTION

This invention relates to a filter device for the softening and/or complete desalination of a liquid, particularly water, of the type which includes a container which is filled with ion exchanger compound and through which the liquid to be treated flows, having an inflow and an outflow opening, and, within the container, a hollow filtering member, the interior of which is connected to the outflow opening, for discharging purified liquid, in general and more particularly to an improved filter device of this nature.

Filter devices with the design noted above are known in a multiplicity of embodiments and are used, for instance, in car repair shops for loading car batteries, in chemical laboratories, pharmacies, etc. so that pure water is available when needed.

In these filer devices, the filtering member is embedded in ion exchanger compound which consists of fine-grain synthetic resin.

In operation of such filter devices, the ion exchanger compound is densified through the influence of the flow and the force of gravity, causing abraded particles of the filer resin to be deposited on the exposed outside of the filtering member and clog up its pores. This leads to an increase of the flow resistance and to a further increase of the development of bridges over the individual pores of the filter mantle.

The smaller the capacity of the container of such filter devices, the larger is the specific liquid throughput or the flow rate, which means that the fine-grain filter resin clogs up the pores of the filtering organ much faster, and that, thereby, the output rate such devices is reduced relatively quickly and permanently.

It is an object of the present invention to maintain, in filter devices of the type described at the outset, the flow resistance through the filter medium as low as possible over extended periods of time.

SUMMARY OF THE INVENTION

According to the present invention this problem is solved by disposing the filtering member within a receiving space which is, at least largely, shielded from the ion exchanger compound and is in communication with the interior of the container.

A simple and advantageous design of the filtering member is obtained if the filtering member comprises a tube which is closed at the end facing the open end of the shielding space, and, at least in the entrance region of the liquid into the receiving space, is enclosed by a filter mantle. The cylindrical or rod-shaped design of the filtering member makes it possible to connect it directly to the discharge opening so as to avoid the region where the force of gravity has a great effect to a large extent when the water flows through the filter medium.

In a preferred embodiment of the invention, the filtering member and the receiving space are cylindrical. This design, due to the vertical extent of the annular interspace, has the advantage that the rate of rise of the water rising in this space is continuously decreased due to the continuous radial penetration of the filter medium inward. As a result the stream of water can bring relatively little resin into the annular space. Thus, the water encounters, when if flows through the filter medium, only that resistance in the upper part of the filtering member, which is generated without the additional loading by fine resins or resin abrasion layers to be penetrated.

Even in the lower layers which are still filled by resin which is carried in the flow resistance of the water through the filter medium is decreased by the fact that the resin layers yet to be penetrated here are freed of the gravity pressure by the action of the shielding tube. In addition, the fine abrasion particles are flushed out by the reversal of the water stream.

In another embodiment of the invention, the tubular filtering member is arranged, together with the shielding tube, at one end of a connecting stub which is held sealed at one end, so that, when the connecting stub is removed from the container, the filtering member with the shielding tube can be taken out of the container at the same time.

It is further provided that the filtering member is disposed within a receiving space which is in communication with the interior of the container at a distance from the wall of the container.

DETAILED DESCRIPTION

Figure 1:
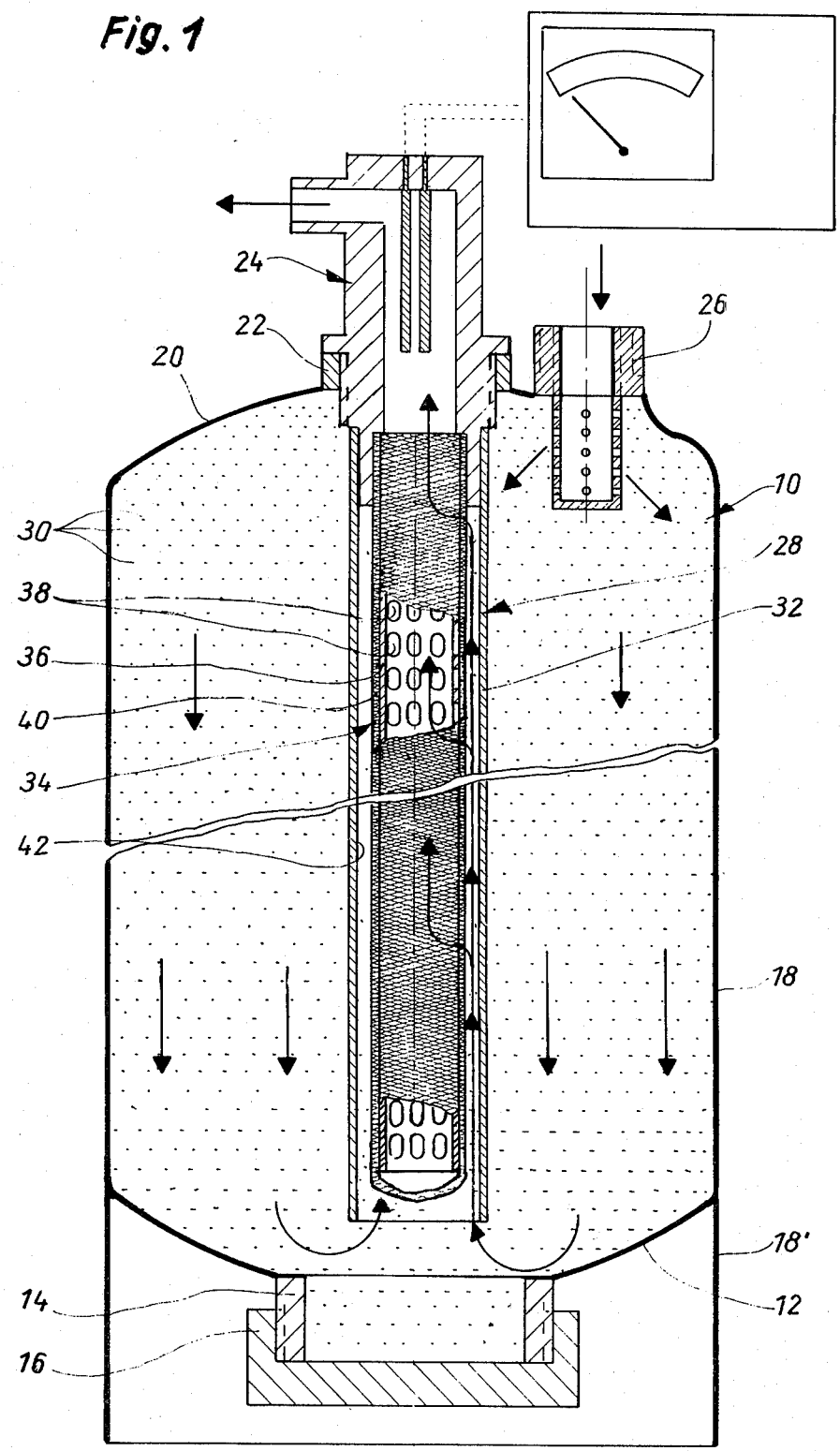
FIG. 1 is a longitudinal section through a filter device according to the present invention which is shown in a foreshortened view.

The filter device shown in FIG. 1 has a pressure proof, preferably cylindrical container 10. Its bottom 12 has, in its central region, a charging and discharging stub 14 which can be closed off by means of a screw cap 16. The cylinder surface 18 of the container has, at its lower end, a surface portion 18' which extends beyond the bottom 12 and forms a container mounting socket. The charging and discharging stub 14 which can be closed off is disposed within this mounting socket.

The upper end face 20 of the container is preferably domed outward. In its central region, a stub 22, which extends upward and has an internal thread is scored to end face 20. A connecting stub 24 for connecting a liquid discharge line is screwed into stub 22. Next to connecting stub 24, a further connecting stub 26 is provided, to which a liquid feed line can be connected.

Within the container a filtering body 28 is disposed. Filtering body 28 extends from the connecting stub 24 up to the region of the container bottom 12. It is connected to the inner end of the connecting stub 24. This filtering body is surrounded by ion exchanger compound 30 which is filled into the container via the filling and discharging stub 14 and consists, for instance, of fine-grain synthetic resin.

The filtering body 28 if formed by a cylindrical shielding tube 32 of circular cross section, the cylindrical surface of which is closed and thereby has its upper end face held at the connecting stub 24 and tightly closed off by the latter. Its lower end face is in the vicinity of the container bottom 12 and is open. Within the shielding tube, the filtering body has a filtering member 34 which is spaced a radial distance from the inside circumference of the shielding tube 32 up into the region of its lower end face. This filtering member 34 is formed by a circular cylindrical perforated passage tube 36, the cylinder surface of which contains openings 38 of relatively large cross section.

The passage tube 36 is closed off at its lower end face by a fine-mesh filter mantle 40 which is pulled over the passage tube 36. The passage tube 36 has its upper end face held at the connected stub 24 together with the filter mantle, like the shielding tube 32, for instance, by cementing to the connecting stub 24. The shielding tube 32 and the filtering member 34 define between them an annular canal 42. At the connecting stub 24 a measuring device for indicating the electric conductivity of purified liquid leaving the filter device is connected in conventional fashion. This meashring device can further be combined with a limit switch which generates an optical or acoustical signal when a previously set conductivity is reached.

The describe filter device is used, for instance, for producing completely desalinated water. The raw water which is fed into the container 10 via the connecting stub 26 can act on the filtering member 34, due to the design of the filtering body 28, only if it has first penetrated the container charge consisting of ion exchanger compound 30, where the ions present in the water are retained by the ion exchanger compound and other ions are given off to the water instead.

After the synthetic resin which forms the ion exchanger compound has been passed, the liquid enters the lower open end face of the shielding tube 32 and acts on the filtering member 34 or its filter mantle 40 over the entire length, inasmuch it is capable of rising in the annular canal 42 and of penetrating the filtering members 34 in the radial direction so that it can flow off again from the filter device via a line connected at the connecting stub 24.

The described design of the filtering body and its arrangement in the container ensure that ion exchanger compound can accumulate only in the lower open region of the shielding tube but cannot fill the annular space 42, so that the exposed side of the filtering member 34 remains free of ion exchanger compound and abrasion particles thereof over its major part and thereby, the pores or meshes of the filter mantle as well as the openings 38 of the passage tube 36 remain unclogged.

Figure 2:
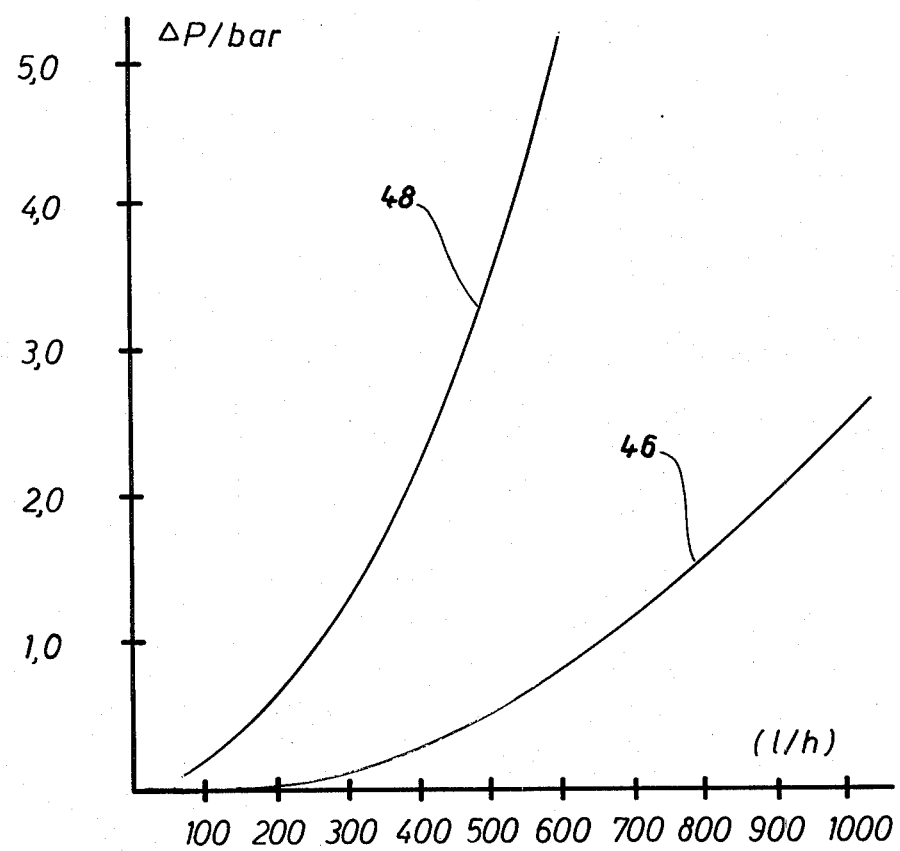
FIG. 2 is a diagram illustrating throughputs.

The performance diagram shown in FIG. 2 illustrates the throughput of the filter device according to the present invention as compared to known devices of this type, for a container volume of 8 liters. In FIG. 2, a curve 46 displays the throughput by means of a filter device according to the present invention, while curve 48 illustrate the flow output of a known filter device for constant liquid pressures.

Particularly noteworthy is the relatively low flow resistance in view of the fact that so-called one-way resins were used in the tests on which the measurement was based; these resins have particularly fine grain and have a correspondingly high very-fine abrasion content.

What is claimed is:

1. In a filter device for the softening and/or complete desalination of a liquid, particularly water, comprising a container which is filled with an ion exchanger compound and through which the liquid to be treated flows, having an inflow and an outflow opening and a hollow filtering member within the container, the interior of the filtering member connected to the outflow opening for discharging purified liquid, the improvement comprising:

the filtering member being a tube which is perforated at its circumference;
a shielding tube closed at its circumference surrounding said filtering member with a spacing, said filtering member extending essentially over the entire length of said shielding tube;
said filtering member connected directly to the discharge opening;
said shielding tube closed at its end face in the region of the discharge side of said filtering member; and
a filter mantle covering said filtering member at least in the entrance zone of the liquid into the space between said filter member and said shielding tube at the end of said filter member disposed at the open end of said shielding tube.

2. The improvement according to claim 1, wherein said container is cylindrical and said shielding tube with the filtering member is arranged therein.

3. The improvement according to claim 2 wherein the jacket of said container extends beyond the bottom thereof and further including a closeable opening in the bottom of said container.

4. The improvement according claim 3, wherein said tubular filtering member together with said shielding tube is arranged at the one end of a connecting stub which is held sealed at the upper part of the container.

* * * * *